United States Patent
Archambault et al.

(10) Patent No.: US 9,680,569 B2
(45) Date of Patent: Jun. 13, 2017

(54) METHOD AND SYSTEM FOR OPTICAL CONNECTION VALIDATION IN A RECONFIGURABLE OPTICAL ADD-DROP MULTIPLEXER (ROADM) NODE

(71) Applicant: Ciena Corporation, Hanover, MD (US)

(72) Inventors: Jean-Luc Archambault, Ottawa (CA); Scott Kohlert, Nepean (CA); Jun Bao, Ellicott City, MD (US); Zhonghua Zhu, Highland, MD (US)

(73) Assignee: Ciena Corporation, Hanover, MD (US)

( * ) Notice: Subject to any disclaimer, the term of this patent is extended or adjusted under 35 U.S.C. 154(b) by 113 days.

(21) Appl. No.: 14/503,488

(22) Filed: Oct. 1, 2014

(65) Prior Publication Data
US 2016/0099851 A1    Apr. 7, 2016

(51) Int. Cl.
*H04B 10/07* (2013.01)
*H04J 14/00* (2006.01)
*H04J 14/02* (2006.01)
*H04B 10/079* (2013.01)
*H04Q 11/00* (2006.01)

(52) U.S. Cl.
CPC .... *H04B 10/07955* (2013.01); *H04J 14/0212* (2013.01); *H04Q 11/0005* (2013.01); *H04Q 11/0066* (2013.01); *H04Q 2011/009* (2013.01); *H04Q 2011/0016* (2013.01); *H04Q 2011/0047* (2013.01); *H04Q 2011/0083* (2013.01)

(58) Field of Classification Search
CPC ............. H04L 43/0811; H04J 14/0212; H04Q 11/0066; H04Q 11/0005; H04Q 2011/0016; H04Q 2011/0083; H04Q 2011/0047; H04Q 2011/009; H04B 10/07955

USPC ............................. 398/9–37, 45–57, 79–97
See application file for complete search history.

(56) References Cited

U.S. PATENT DOCUMENTS

| | | | | |
|---|---|---|---|---|
| 5,319,482 A * | 6/1994 | Tsuchiya | .............. | H04B 10/071 356/73.1 |
| 6,005,696 A * | 12/1999 | Joline | .................... | H04B 10/07 370/241 |
| 6,246,497 B1 * | 6/2001 | Bateman | .............. | H04B 10/071 398/167 |
| 6,317,231 B1 * | 11/2001 | Al-Salameh | ......... | H04B 10/077 398/14 |
| 6,317,535 B1 * | 11/2001 | Jennings | ............ | G01M 11/3136 385/24 |
| 6,327,060 B1 * | 12/2001 | Otani | .................... | H04B 10/035 398/167 |
| 7,161,964 B2 * | 1/2007 | Lentine | ..................... | H04J 3/04 370/535 |

(Continued)

*Primary Examiner* — Ken N Vanderpuye
*Assistant Examiner* — Dibson Sanchez
(74) *Attorney, Agent, or Firm* — Clements Bernard Walker PLLC; Christopher L. Bernard; Lawrence A. Baratta, Jr.

(57) ABSTRACT

A method of validating connections in an optical add/drop multiplexer (OADM) that includes a plurality of modules configured to route optical signals through the OADM, and at least one multi-fiber cable connecting modules of the OADM. A light source coupled to a first port of a first module is controlled to emit a test light. A determination is made whether or not the test light is received at a first photo-detector connected to a second port. Continuity of a connection between the first port and the second port is validated when the test light is received at the first photo-detector.

17 Claims, 12 Drawing Sheets

(56) References Cited

U.S. PATENT DOCUMENTS

| | | | | |
|---|---|---|---|---|
| 7,599,618 B2* | 10/2009 | Adam | ............... | G01J 1/04 398/10 |
| 8,417,114 B1* | 4/2013 | Storey | ............... | H04B 10/0773 398/16 |
| 8,750,702 B1* | 6/2014 | Figueira | ............... | H04B 10/00 398/16 |
| 2002/0149812 A1* | 10/2002 | Hong | ............... | H04J 14/02 398/27 |
| 2003/0149921 A1* | 8/2003 | Lau | ............... | H04L 1/243 714/704 |
| 2004/0096214 A1* | 5/2004 | Morreale | ............... | H04B 10/0775 398/33 |
| 2004/0165888 A1* | 8/2004 | Gerstel | ............... | H04B 10/035 398/45 |
| 2004/0175171 A1* | 9/2004 | Kokkinos | ............... | H04B 10/00 398/14 |
| 2007/0217330 A1* | 9/2007 | Ohkawa | ............... | H04J 3/085 370/222 |
| 2008/0232760 A1* | 9/2008 | Xia | ............... | H04B 10/0775 385/140 |
| 2008/0267623 A1* | 10/2008 | Manifold | ............... | H04J 14/0226 398/33 |
| 2010/0253936 A1* | 10/2010 | Xia | ............... | H04B 10/07953 356/73.1 |
| 2010/0266275 A1* | 10/2010 | Xia | ............... | H04B 10/0773 398/16 |
| 2011/0085801 A1* | 4/2011 | Palacharla | ............... | H04J 14/0212 398/48 |
| 2011/0116789 A1* | 5/2011 | Wellbrock | ............... | H04J 14/0279 398/5 |
| 2011/0142139 A1* | 6/2011 | Cheng | ............... | H04N 21/4341 375/240.25 |
| 2011/0142440 A1* | 6/2011 | Xia | ............... | H04B 10/0775 398/16 |
| 2011/0200324 A1* | 8/2011 | Boertjes | ............... | H04J 14/0212 398/16 |
| 2013/0195462 A1* | 8/2013 | Ghioni | ............... | H04J 14/0219 398/83 |
| 2013/0259474 A1* | 10/2013 | Ji | ............... | H04J 14/0212 398/48 |
| 2013/0315579 A1* | 11/2013 | Xia | ............... | H04Q 11/0001 398/5 |
| 2015/0208146 A1* | 7/2015 | Younce | ............... | H04Q 11/0066 398/21 |

\* cited by examiner

Figure 3

METHOD AND SYSTEM FOR OPTICAL CONNECTION VALIDATION IN A RECONFIGURABLE OPTICAL ADD-DROP MULTIPLEXER (ROADM) NODE

CROSS REFERENCE TO RELATED APPLICATIONS

This is the first application filed in respect of the present invention.

TECHNICAL FIELD

The present invention relates generally to fibre-optic communication systems, and in particular to techniques and systems for validating optical connections in a Reconfigurable Optical Add-Drop Multiplexer (ROADM) node.

BACKGROUND

Fibre optic networks often employ tunable technologies both for optical add/drop ports and for transmitters. Transmitters using tunable lasers are desirable for several reasons. First, tunable lasers reduce the number of product variants required to construct the network. For example, a Dense Wavelength Division Multiplexed (DWDM) communications band typically has 80 channels. If fixed wavelength (i.e. non-tunable) lasers are used to drive this channel band, then 80 different variants of the transmitter laser are required. This is problematic, especially for customers who must maintain an inventory of appropriate transmitter components for replacement in the case of failure (sometimes called "sparing"). The second reason is that the use of tunable lasers enables re-tuning the transmission wavelength of any given channel in the system for the purpose of reconfiguration, which in turn enables the implementation of a Reconfigurable Optical Add/Drop Multiplexer (ROADM).

The Add portion of a ROADM can be made tunable by including a tunable filter which is tuned in conjunction with the transmitter laser. Prior to the introduction of practical Digital Signal Processor (DSP) based coherent transmitters, it was commonplace to use Distributed Feedback (DFB) or Distributed Bragg Reflector (DBR) tunable laser designs, which have significant out of band noise in the form of side modes and spontaneous emission. This noise needed to be rejected, which drove the need for filtering the laser output light.

Prior to the introduction of practical DSP based coherent receivers, it was commonplace to use direct detection receivers. In a DWDM system, direct detection receivers require optical filters to separate a desired one wavelength channel from the DWDM signal, and present the separated channel light to the receiver for detection. This type of receiver can detect any wavelength which the optical filter chooses. Therefore, the drop portion of the OADM can be made tunable by including a tunable filter.

However, tunable filters are expensive. Reducing the number of tunable filters is advantageous. With coherent transmitters/receivers, it is possible to reduce or eliminate the filtering from the adds/drops. For example, please refer to PCT/CA2009/001455 titled COHERENT AUGMENTED OPTICAL ADD-DROP MULTIPLEXER and filed on Sep. 11, 2009 which is herein incorporated by reference in its entirety. The result is to replace the optical filters with couplers and splitters which are not wavelength selective.

FIG. 1 is a block diagram schematically illustrating elements of an 8-degree Colorless Directionless Contentionless (CDC) ROADM 2 known in the prior art. In the example of FIG. 1, the ROADM 2 generally comprises a respective Wavelength Selective Switch (WSS) module 4 for routing wavelength channels to and from each degree; MUX/DE-MUX modules 6 for routing wavelength channels to and from respective transceivers 8; and a Fiber Interconnection Module (FIM) 10 for optically interconnecting the WSS and MCS modules.

Each transceiver 8 typically comprises a transmitter and a receiver (not shown in FIG. 1). In some ROADM systems, the transmitter and receiver are configured to operate at the same wavelength, although this is not essential.

In the illustrated ROADM, each Wavelength Selective Switch (WSS) module 4 is provided as a 1×20 WSS. In the ingress direction, each WSS is capable of routing individual WDM channels received from its respective degree via its common-IN port to any of its twenty output ports. In the egress direction, the WSS can select WDM channels from twenty different input ports and couple them to its respective degree via its common-OUT port.

In the illustrated ROADM, each MUX/DEMUX module 6 is configured using an 8×16 Multi-Case Switch (MCS). In the ingress direction, each MCS 6 is capable of routing optical signals received through any of its eight input ports to any combination of its sixteen transceiver ports. In the egress direction, the MCS couples light received from any combination of its sixteen transceiver ports to any of its eight output ports.

The Fiber Interconnection Module (FIM) 10 is typically provided as a patch panel providing all of the necessary interconnections between the WSSs 4 and MCSs 6. By means of optical connections within the FIM 10, every WSS 4 is connected to every other WSS 4 and to every MCS 6. For example, the FIM 10 provides connections for coupling each of the eight output ports of an MCS 6 to an input port of each of the eight WSSs 4, so that optical signals from all eight degrees can be coupled to any transceiver 8 subtending any one of the twelve MCSs 6. In addition, the FIM 10 provides connections for coupling each of the eight WSS's to all of the other WSS's, so that an optical signal received from one degree can be optically routed to another degree. For the sake of clarity of illustration FIG. 1 only shows optical connections through the FIM 10 between the WSS module 4 on Degree #1 and each of the twelve MCS modules 6 and the respective WSS modules on each of the other degrees. It will be appreciated that each of the optical connections shown in FIG. 1 would normally be implemented as a pair of optical paths to enable bi-directional optical signal flow, and that a corresponding set of connections would be provided for connecting to WSS modules 4 on all of the other degrees both to each other and to each of the MCS modules 6.

Because of the large number of fiber interconnections between the FIM 10 and each of the WSSs 4 and MCSs 6, it is advantageous to make use of multi-fiber patch-cord such as Multiple-Fiber Push-On/Pull-off (MPO) connectors or Multiple-Fiber Push-On (MTP) cables in order to simplify the cabling process. In the example of FIG. 1, each 1×20 WSS 4 includes a conventional duplex Local Connector (LC) 12 to connect its common-IN and common-OUT ports to the fiber pair corresponding to a particular degree, as well as 4 MPO connectors 14, each with 12 optical fibers. Each WSS 4 uses 2×20=40 of the 48 available fibers, leaving 8 unused fibers across the 4 MPO connectors 14. Similarly, each MCS module 6 has 2 MPO terminations 16 (for a total of 24 fibers) carrying 2×8=16 active fibers and 8 unused fibers. Each MCS 6 also has 16 transceiver-facing duplex LCs 18 to connect to up to sixteen individual transceivers 8.

One challenge of using multi-fiber connectors like MPO's is that the user must be able to confirm during the initial installation that all fibers within a particular MPO have continuity and acceptable losses, including fibers that may not be in use initially but that could become active after a node upgrade. The reason for this requirement is that the use of an MPO cable makes it impossible to service individual fibers, i.e. if a problem is found on a previously unused fiber at the time of the node upgrade, all 12 fibers must be disconnected at once to service the cable, which could be interrupting traffic in a section of the ROADM that was already up and running.

It is, therefore, desirable to provide a connection validation technique capable of validating all fibers of a multi-fiber cable, including fibers that are not currently in use.

SUMMARY

Aspects of the present invention provide methods and systems to validate physical connections within an optical add/drop multiplexer (OADM).

According to one aspect, the present invention provides a method of validating connections in an optical add/drop multiplexer (OADM) that includes a plurality of modules configured to route optical signals through the OADM, and at least one multi-fiber cable connecting modules of the OADM. A light source coupled to a first port of a first module is controlled to emit a test light. A determination is made whether or not the test light is received at a first photo-detector connected to a second port. Continuity of a connection between the first port and the second port is validated when the test light is received at the first photo-detector.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Representative embodiments of the invention will now be described by way of example only with reference to the accompanying drawings, in which:

FIG. 3 is a block diagram schematically illustrating the ROADM of FIG. 1 with loop-back connectors on un-used terminals of the Fiber Interconnection Module (FIM), in accordance with a representative embodiment of the present invention;

It will be noted that throughout the appended drawings, like features are identified by like reference numerals.

DETAILED DESCRIPTION

Generally, the present invention provides a method and system for connection testing and/or validation of a multi-fiber patch-cord or cable in a Reconfigurable Optical Add-Drop Multiplexer (ROADM).

In general terms, the present technique a connection validation (CV) procedure that is capable of confirming continuity and losses on every individual fiber connection within the ROADM node. This method relies on the ability to generate and detect light on every possible connection, including future connections in a node that is not yet fully populated. The present technique is both efficient and cost effective, largely reusing components already found in the ROADM elements, with the addition of a few items.

In some embodiments, the present technique may be implemented by means of software instructions stored on a suitable memory, for execution by either a management processor of a node or a computer connected to the node. This enables an automated process for validating connections in the node.

In embodiments of the present technique, a connection may be validated by inserting test light into the connection and detecting that light at a downstream location. If the light is detected, then optical continuity it between the source and the detector is confirmed. For example, light may be inserted into a connection within an MCS module. Detection of the inserted light by a photodetector in a WSS module confirms optical continuity of the connections between the MCS and the WSS modules via the FIM. In embodiments of the present technique, the following hardware elements may be used, either alone or in any suitable combination:

1/ One or more Light sources which can be coupled to each output port of a WSS module 4 or an MCS module 6 connected (via an MPO connector) to the Fiber Interconnection Module (FIM) 10;

2/ Photodetectors which can detect the presence (and optionally power levels) of optical signals at each input port of a WSS module 4 or an MCS module 6 connected (via an MPO connector) to the FIM 10; and 3/ Loopback connectors at an unused port of the FIM 10.

Figure 1:
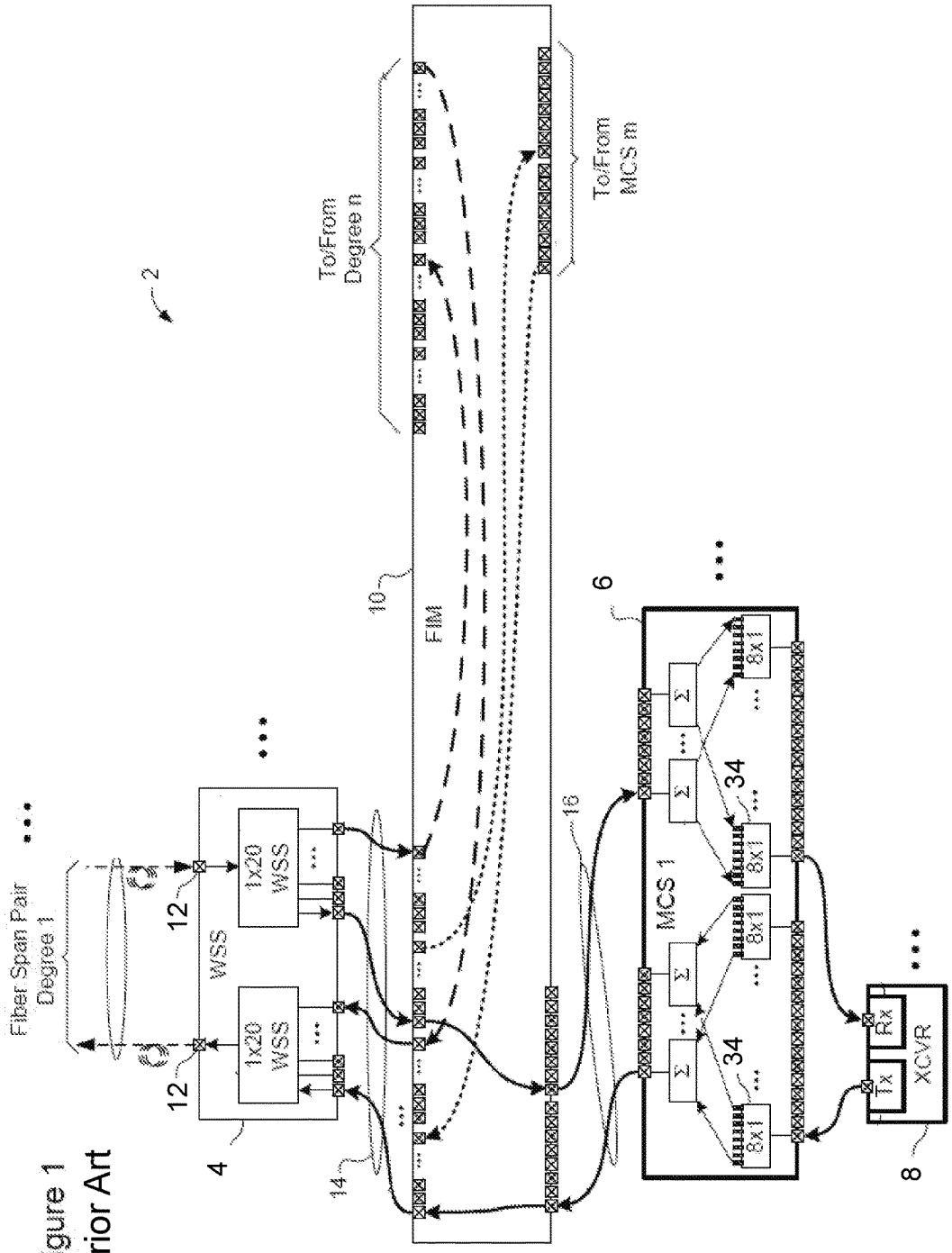
FIG. 1 is a block diagram schematically illustrating elements of a conventional 8-degree Colorless Directionless Contentionless (CDC) Reconfigurable Optical Add-Drop Multiplexer (ROADM) known in the art.
Figure 2A:
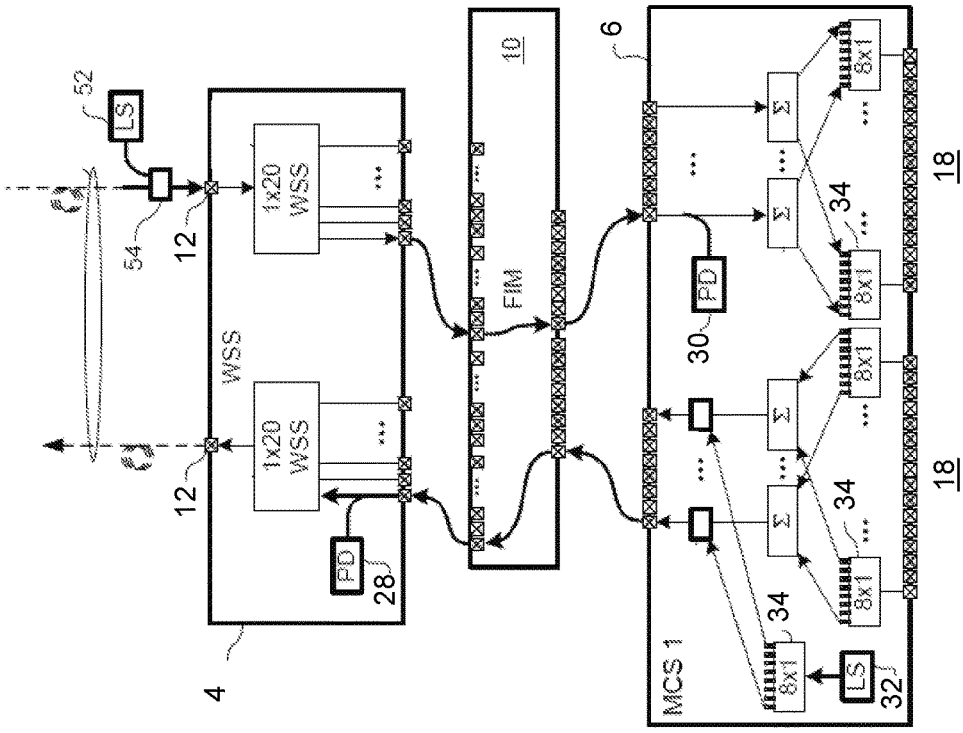
FIGS. 2A-2E are block diagrams schematically illustrating respective different scenarios for verifying connections in the ROADM of FIG. 1, in accordance with a representative embodiment of the present invention.

There are a number of options for implementing the light sources and detectors within the WSS and MCS modules 4 and 6, some of which are shown in FIGS. 2A to 2E. In the example of FIG. 2A, a dedicated light source 20, 22 is multiplexed into each WSS and MCS output port through a WDM filter 24, 26. In some embodiments a 1310 nm source may be used but other wavelengths are possible. Preferably, the wavelength of the light source 20, 22 is selected to avoid overlap with the signal band. Each WSS and MCS input port has a tap and a photodetector (PD) 28, 30 capable of detecting light from the dedicated light source 20, 22. It would also be possible to use a WDM filter instead of a tap. When multi-fiber cables are installed between the WSS 4 and MCS 6 modules and the FIM 10, the light sources 20, 22 may be activated and the photodetector signals analysed to verify continuity through the FIM 10. In embodiments in which the output power of each light source 20, 22 is known, the photodetector signals may also be analysed to determine insertion loss of the path through the FIM 10. In some embodiments, calibration of a light source may be achieved by providing a tap photodetector (not shown) at the output of each light source 20, 22 to measure the launch power. There is also an option to implement a signaling protocol, for example by modulating a light source 20, 22 with data to provide a unique identifier corresponding to a particular port on a particular card, for example. This information can then be detected in the photodetector signals to allow confirmation of the point of origin of any given signal, which can allow the ROADM to "auto-discover" its topology.

One disadvantage of the embodiment of FIG. 2A is that it requires a large number of additional optical components. For example, twenty light sources 20 and WDM filters 24 are required in each WSS module 4 and eight light sources 22 and WDM filters 26 are needed in each MCS module 6. These additional light sources and filters increase cost and complexity of the WSS and MCS modules.

Figure 2B:
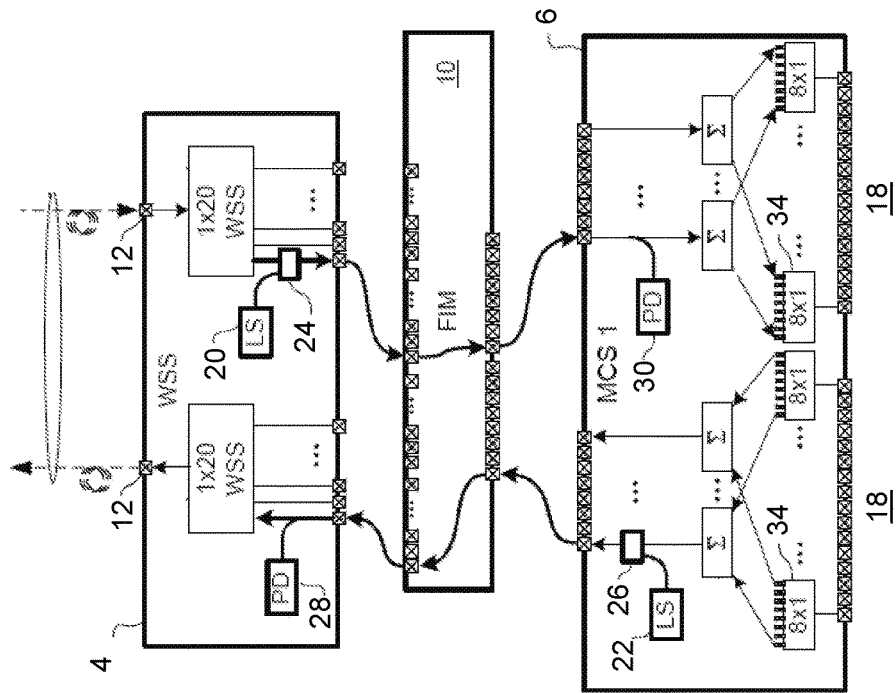

FIG. 2B shows an alternative arrangement with functionality similar to that of FIG. 2A, but using with shared light sources. In this example, a single wavelength DFB laser 32 is coupled through a WDM filter 34 to the common input port of the WSS. The wavelength of this source needs to be within the transmission band of the WSS, but is preferably outside the signal band. One implementation example would be to have the DFB laser 32 at 1528.0 nm in a system with a signal band ranging from 1528.8 nm to 1566.7 nm, with a WSS capable of routing wavelengths from 1528.0 to 1566.7 nm. In this case, the WSS can switch the DFB signal to any of its 20 output ports, which allows the system software to perform CV on all the corresponding connections by cycling through them one by one. Because the CV wavelength does not overlap with WDM traffic, this function can be done in service. A similar approach can be used in the MCS module 6, however in this case an additional 1×8 switch 36 must be provided to couple the DFB source 38 to any one of the 8 possible outputs going to the FIM 10.

In some embodiments, each output port of an MCS module 6 includes a respective Erbium Doped Fiber Amplifier (EDFA) 40. In such cases, the dedicated light source of FIGS. 2A and 2B may be eliminated and the EDFA used as the light source instead. This arrangement is shown in FIG. 2C. In the absence of an input optical signal, EDFA's can easily be turned into ASE (amplified spontaneous emission) sources by running the pump lasers of the EDFA under constant current. Many conventional MCS module designs require amplification and in the example shown in FIG. 2C, each output port of the MCS 6 has an EDFA 40 which can be used as a controllable ASE source. Note that an EDFA is a broadband source that overlaps with the signal band, so this option can only be enabled with MCS ports that are out of service, which is still very useful for connection validation. FIG. 2C also shows a similar ASE source 42 in the WSS module 4, but in this case it is coupled to the signal path via a narrow-band WDM filter 44, with the filter wavelength selected to be outside the signal band, e.g. at 1528.0 nm. This allows a single shared ASE source to be switched to the different WSS output ports without affecting the WDM traffic that may already be going through the node. Although EDFA ASE sources cannot be modulated at high speed, low-speed signaling is still possible by turning the EDFA's on and off to create data patterns.

Figure 2D:
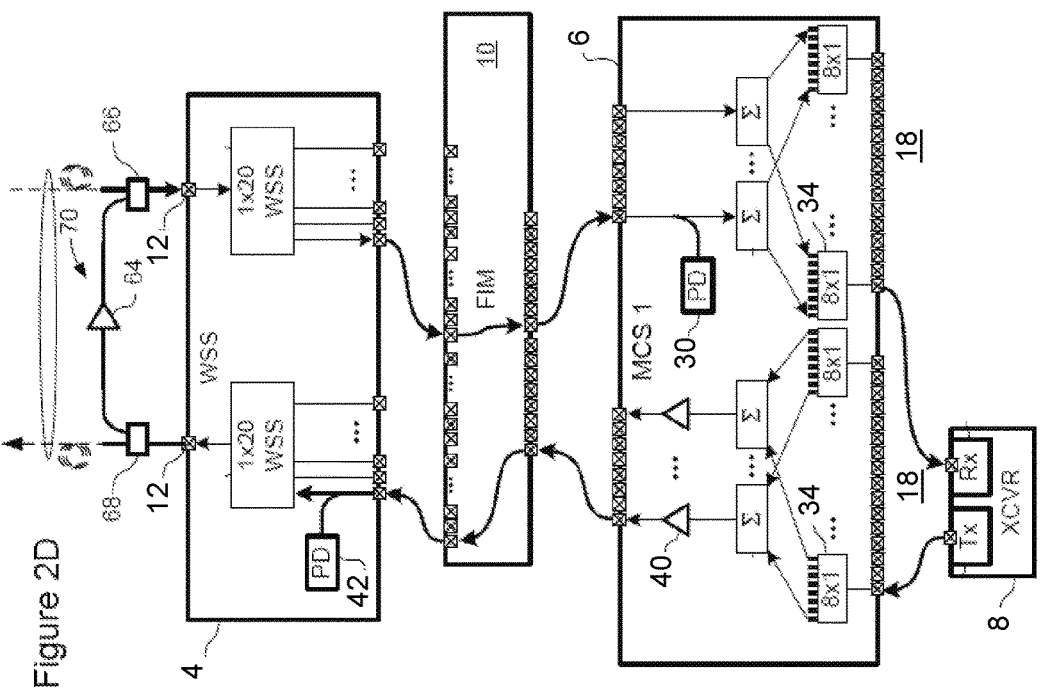
Figure 2C:
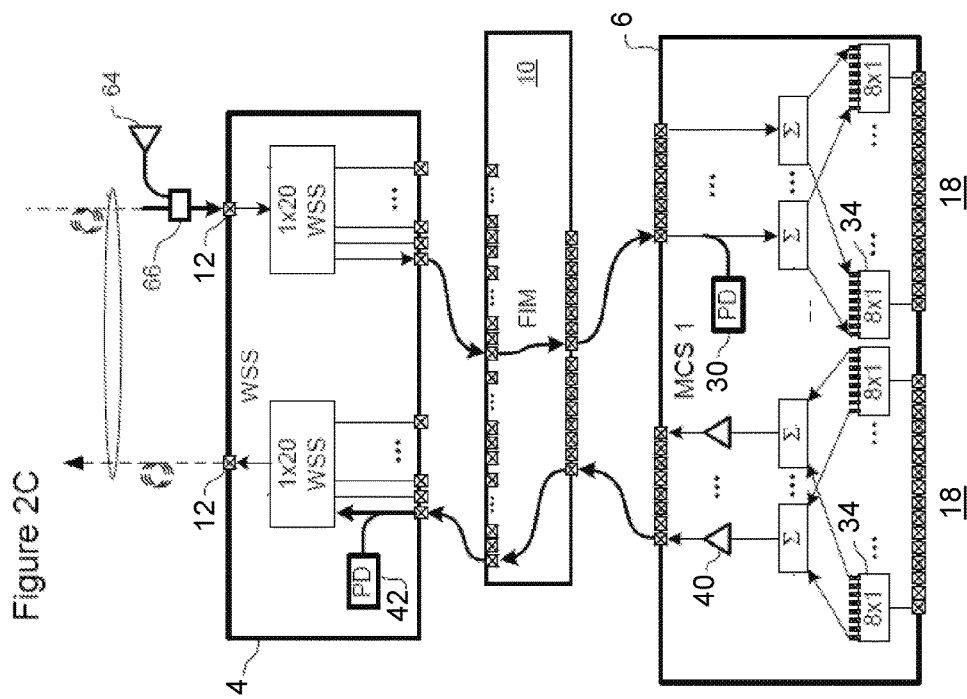

FIG. 2D shows an example in which the EDFA used as an ASE source within the WSS can also provide an amplified loopback path. In this case, the common output port of the WSS 4 is coupled to the input of the EDFA via a WDM filter 46 at the dedicated CV wavelength (e.g. 1528.0 nm). As shown in FIG. 2D, this makes it possible to configure the ROADM node in a loopback mode where a local transceiver 8 can tune to the CV wavelength and then be routed through the WSS 4 and back onto itself. This allows the system software to verify that a) the local transceiver 8 is operational and b) that it is properly connected to the ROADM. This type of feature is particularly important in colorless ROADMs to avoid wavelength collisions between mis-provisioned or mis-connected channels.

Figure 2E:
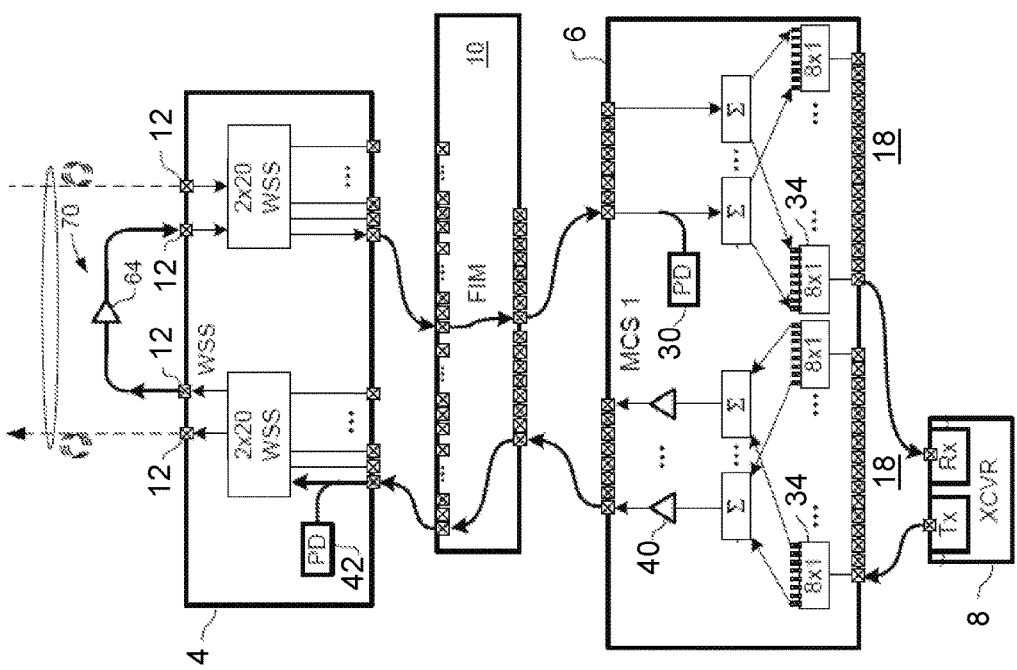

FIG. 2E illustrates an example in which each WSS module 4 is implemented as a 2×20 WSS, which operates to couple wavelength channels from any of its 20 input ports to either one of its 2 common-OUT ports, and in the ingress direction it can couple wavelength channels from any of its 2 common-IN ports to any of its 20 output ports. In the example of FIG. 2E, one each of the common-IN and common-OUT ports are used as loopback ports. This arrangement removes the need to use a WDM filter to couple Connection Validation (CV) signalling through the loopback path, which has the advantage of reducing the insertion loss for the WDM traffic going through the node. Another advantage is both the signal path and the loopback path are now more broadband, which provides more flexibility, for example allowing multiple XCVR's to be looped back simultaneously through the same WSS using different wavelengths.

Figure 3:
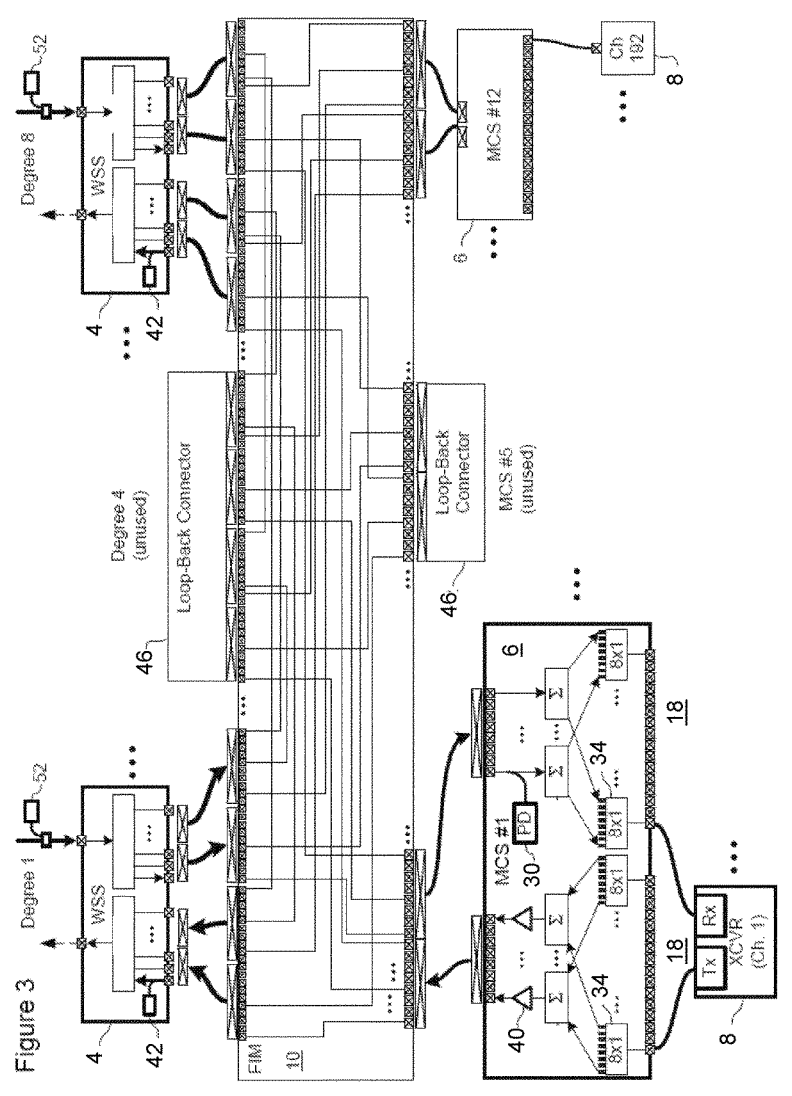
Figure 4B:
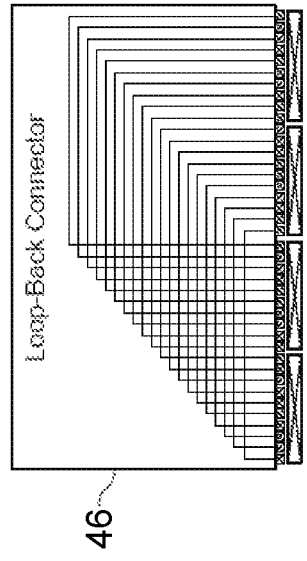
FIGS. 4A-4B are block diagrams schematically illustrating the loop-back connectors of FIG. 3 in greater detail.
Figure 4A:
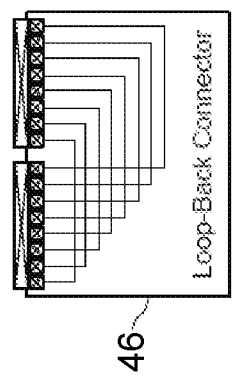

In accordance with the present technique, out-of service (un-used) connections can be validated by means of loopback connectors at each un-used port of the FIM. As mentioned above, the FIM is provisioned with a pair of optical paths connecting each degree port to all of the other degree ports and all of the MCS ports. FIG. 3 illustrates the connections between three degree ports and three MCS ports of the FIM 10. The other WSS and MSC ports (and their associated connections) are not illustrated for the sake of clarity of the drawing, but can be readily constructed from the information presented in FIG. 3. In the illustration of FIG. 3, one of the degree ports and one of the MCS ports are unused, and so are coupled to respective loop-back connectors 46. It is contemplated that all unused WSS and MSC ports of the FIM 10 would be coupled to suitable loop-back connectors. As may be seen in FIGS. 4A and 4B, each loop-back connector 46 is configured to optically connect corresponding pairs of fibers, so that an optical signal will be routed back to the particular module from which that signal was sent.

Figure 5A:
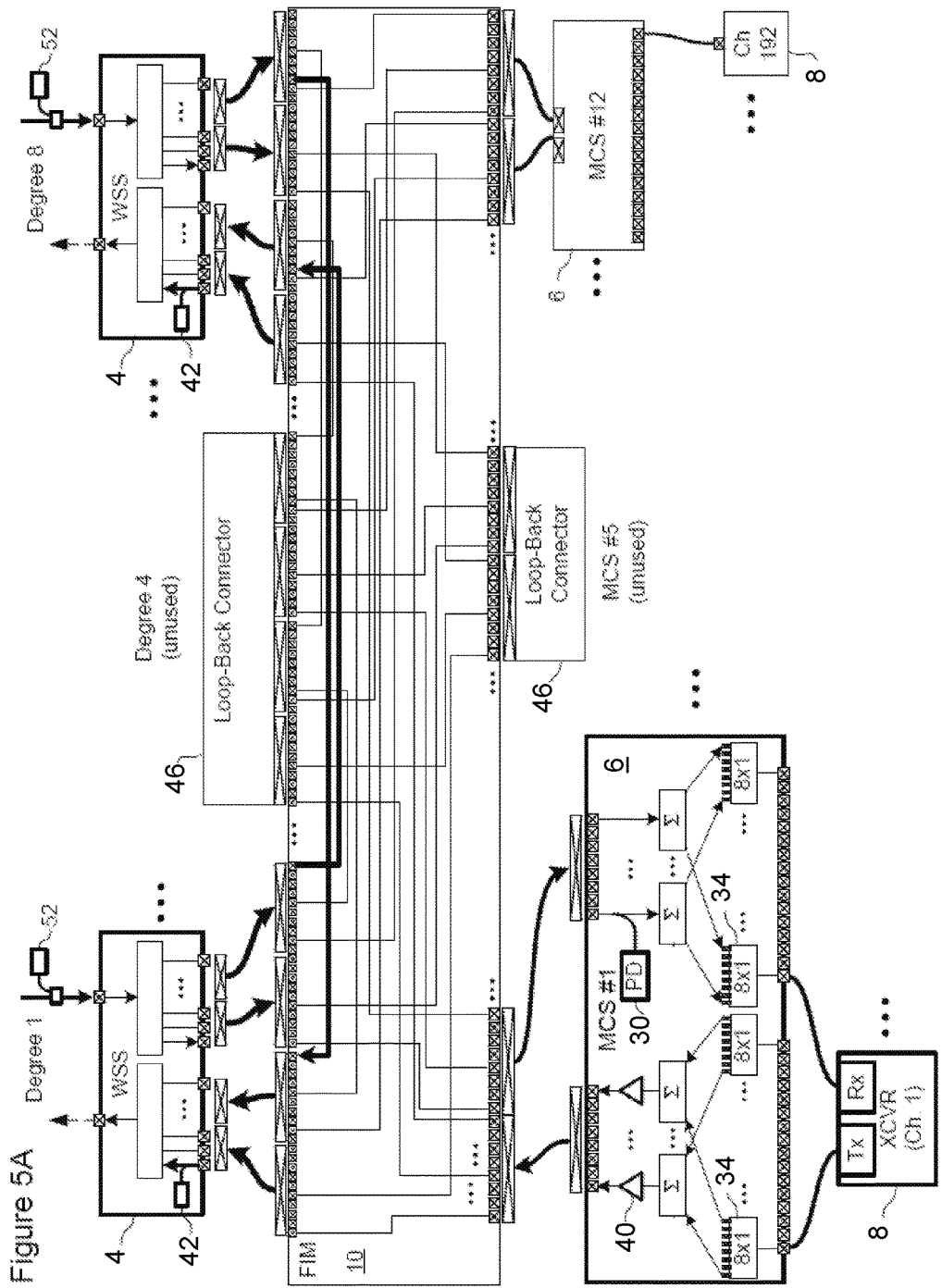
FIGS. 5A-5E illustrate respective different scenarios for verifying connections in the ROADM of FIG. 3, in accordance with a representative embodiment of the present invention.

FIG. 5A illustrates the signal paths through the FIM between the WSS module on degree 1 and the WSS module on degree 8. This enables the connections between these two modules to be validated using light sources and detectors within each WSS module as described above with reference to FIGS. 2A-E

Figure 5B:
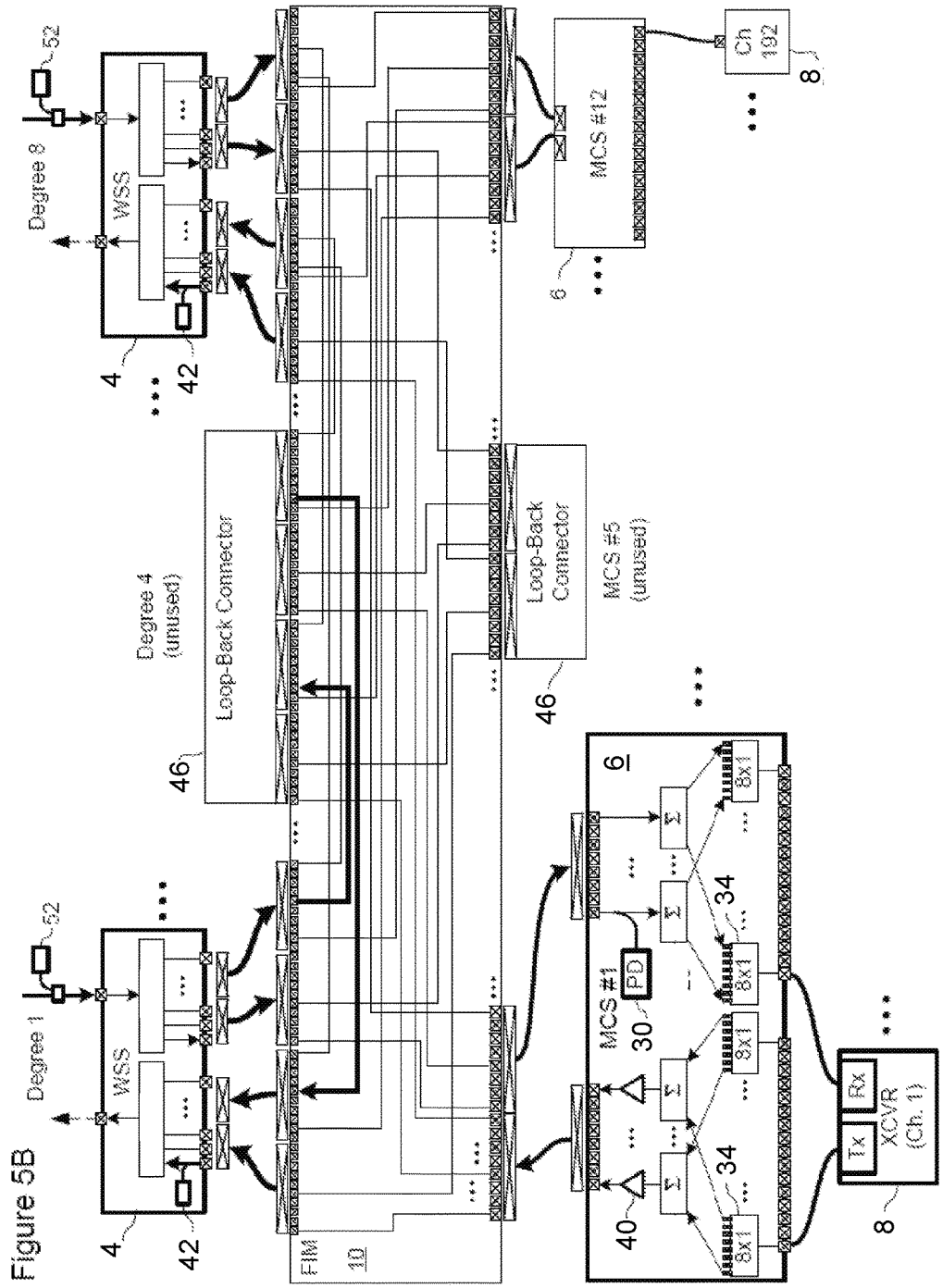

FIG. 5B shows a similar example where the connections between the WSS module on degree 1 and a loop-back connector on degree port 4 are validated. In this case, the light sources and detectors in the WSS module are used to validate the connections in both directions (to and from the loop-back connector). In so doing, the unused fibers in the MPO connectors between the WSS module and the FIM can be validated, even though they are currently unused.

Figure 5C:
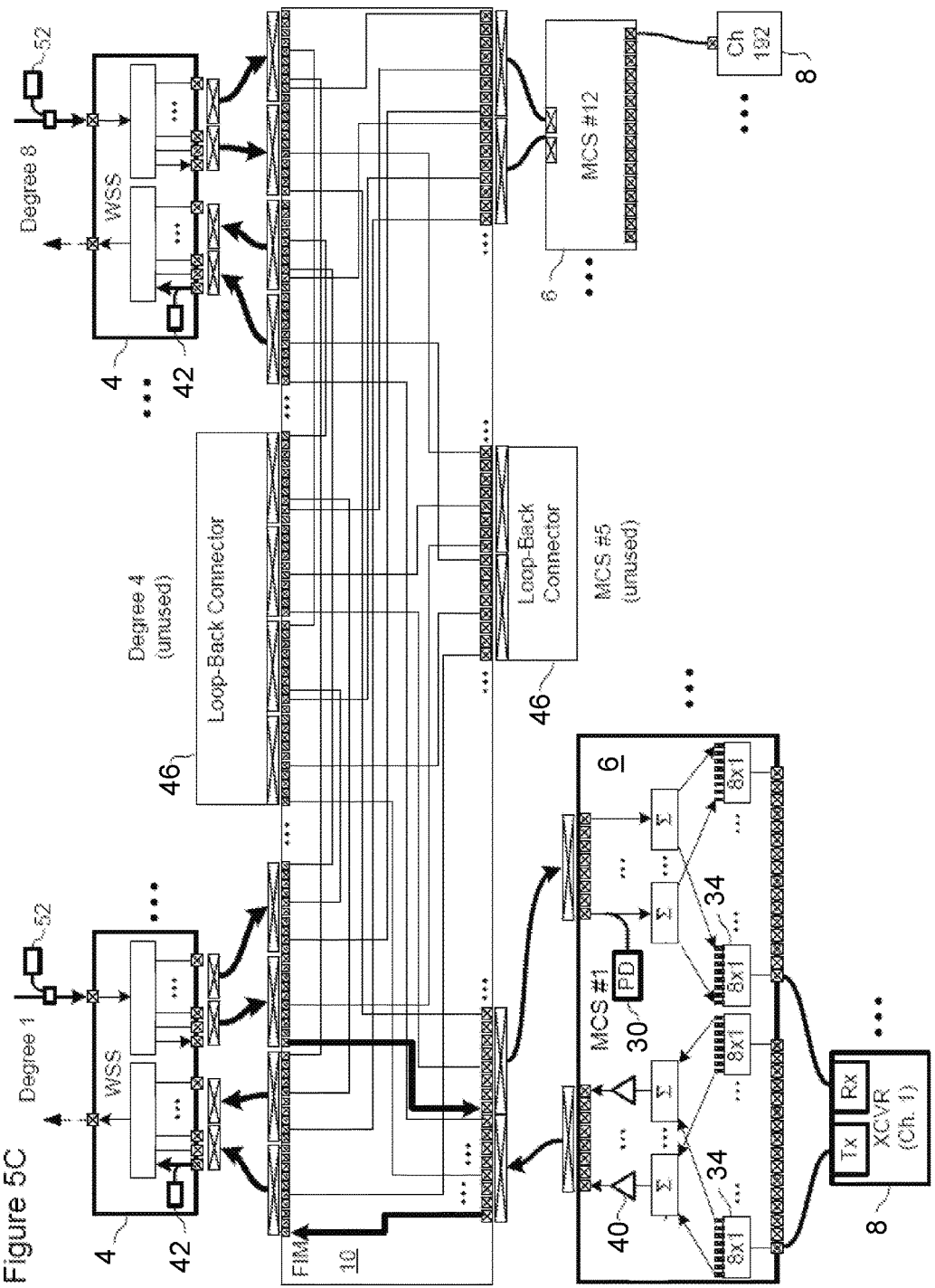

FIG. 5C illustrates the signal paths through the FIM between the WSS module on degree 1 and the MCS module #1. This enables the connections between these two modules to be validated using light sources and detectors within each module as described above with reference to FIGS. 2A-E

Figure 5D:
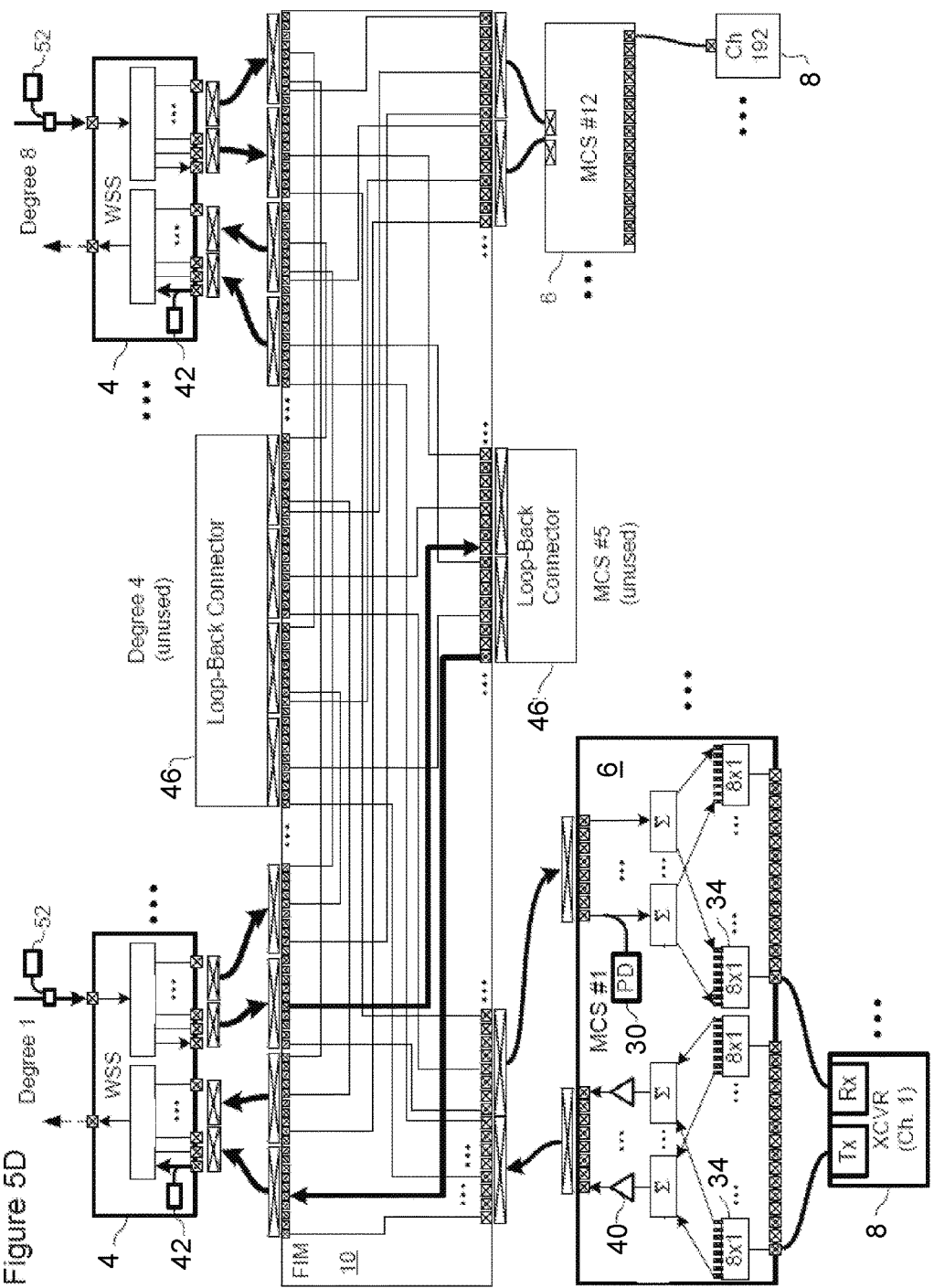
Figure 5E:
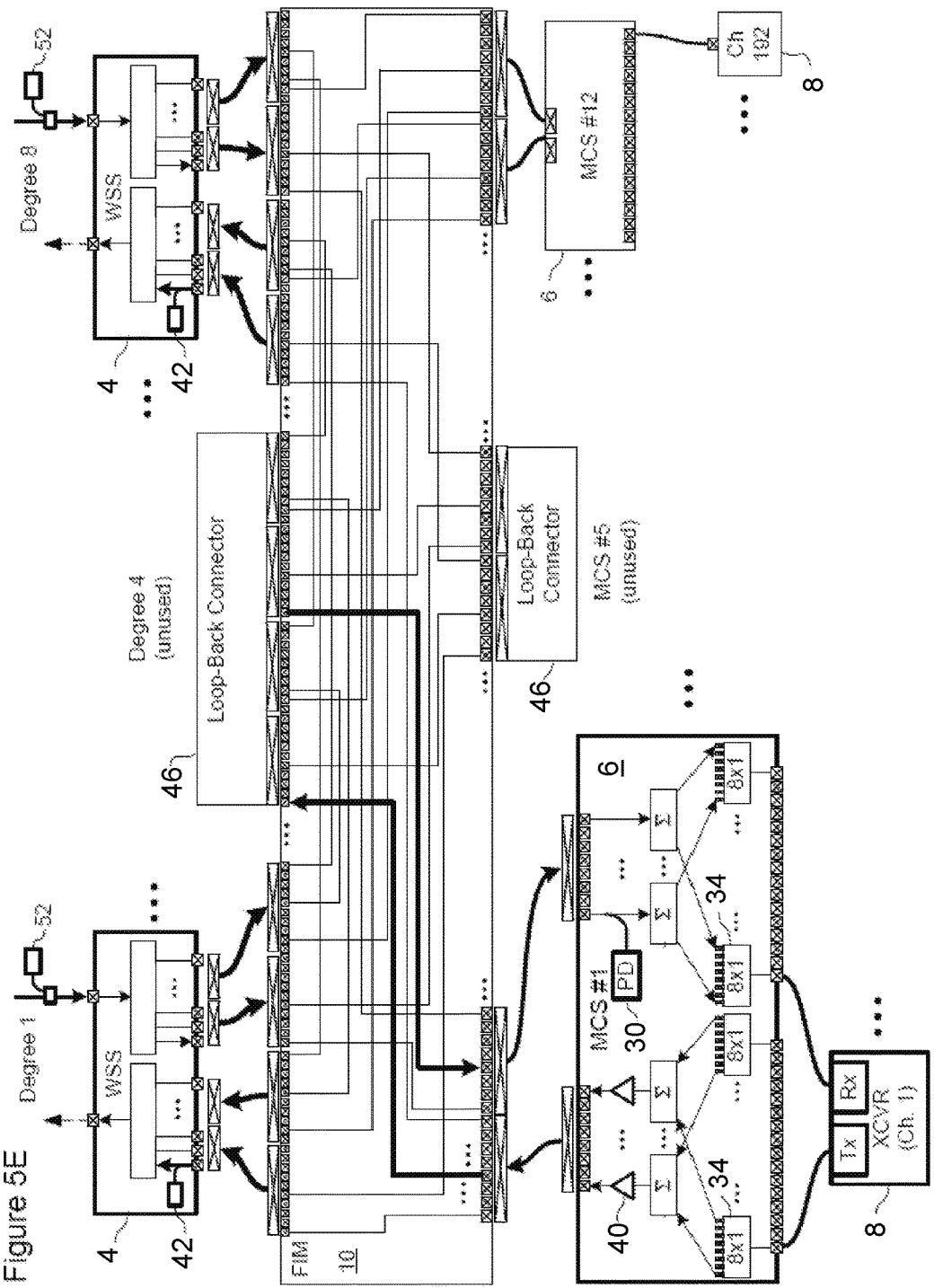

FIG. 5D shows how a connection from a WSS module to a missing MCS module can be validated using the loopback connector provisioned at the MCS port. In this example, the WSS module on degree 1 is sending a signal from Demux port 5 and detecting that same signal at Mux port 5, after it loops back through the FIM. This ensures that the dark fibers that will be used at a later date to provision a new MCS have continuity and sufficiently low losses. FIG. 5D shows a similar example where a connection between MCS module #1 and a missing WSS module (in this case on degree 4) can be validated by means of light sources and detectors in the MCS module and a loop-back connector on the degree port of the FIM.

Figure 6:
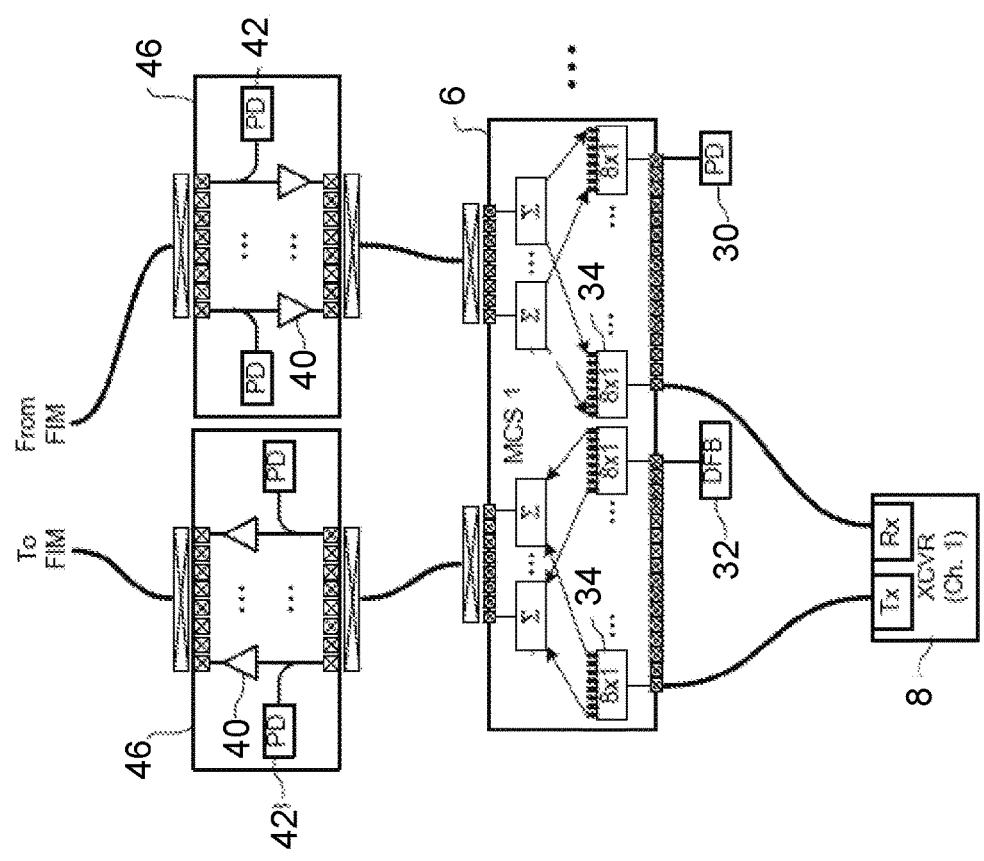
FIG. 6 is a block diagram illustrating use of an MCS module of FIG. 3 in another scenario for verifying connections in the ROADM of FIG. 3, in accordance with a representative embodiment of the present invention.

FIG. 6 illustrates an alternative arrangement in which a DFB laser 50 and a photodetector 52 are connected to a respective port of an MCS module 6. In some embodiments, the DFB laser and photodetector may be external to the MCS module, as shown in FIG. 6. In other embodiments, the DFB laser and photodetector may be internal to the MCS module 6. In both of these embodiments, the number of transceiver ports of the MCS module 6 that are available for connection to transceivers is reduced (by one). If desired, the number of transceiver-facing ports of the MCS module 6 may be increased to compensate for this reduction. For example, in the embodiment of FIGS. 2, 3 and 5, each MCS 6 is configured as an 8×16 MUX/DEMUX, having a total of 16 transceiver ports, and therefore capable of supporting up to 16 transceivers. If desired, the MCS 6 may be reconfigured as an 8×17 (or, more generally, an N×M+1) MUX/DEMUX, capable of supporting a total of 17 transceiver ports. With this arrangement, one of the possible transceiver ports is dedicated (either internally or externally of the MCS module) to the connection validation DFB laser and photodetector, while the remaining 16 transceiver ports remain available for connection to transceivers. This arrangement enables the validation of connections through the MCS module 6, and between the MCS module 6 and the FIM 10 and WSS modules 4, without requiring a transceiver 8 to generate and detect the test signal.

In the preceding description, embodiments are described in the context of an example embodiment ROADM made up of WSS modules 4, a FIM 10 and MCS modules 8. It will be appreciated that ROADMs may be configured using different architectures, and different combinations of modules, and that the present techniques may be equally applied in such alternative architectures. For example, in some cases, a plurality of EDFAs may be provided in one or more modules coupled between e.g. a FIM and an MCS module. In such cases, the present techniques may be used to control the EDFAs connected in un-used optical paths to provide test signals for validating connectivity of those paths. In embodiments in which an EDFA module also contains photodetectors, these may be used in the present technique, as described above with reference to FIGS. 2A-2E.

In the preceding description, for purposes of explanation, numerous details are set forth in order to provide a thorough understanding of the embodiments of the invention. However, it will be apparent to one skilled in the art that these specific details are not required in order to practice the invention. In other instances, well-known electrical structures and circuits are shown in block diagram form in order not to obscure the invention. For example, specific details are not provided as to whether the embodiments of the invention described herein are implemented as a software routine, hardware circuit, firmware, or a combination thereof.

Embodiments of the invention can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention can also be stored on the machine-readable medium. Software running from the machine-readable medium can interface with circuitry to perform the described tasks.

The above-described embodiments of the invention are intended to be examples only. Alterations, modifications and variations can be effected to the particular embodiments by those of skill in the art without departing from the scope of the invention, which is defined solely by the claims appended hereto.

We claim:

1. A method of validating connections in an optical add/drop multiplexer (OADM) comprising a plurality of modules configured to route optical signals through the OADM, and at least one multi-fiber cable connecting modules of the OADM, the method comprising:
controlling a light source connected to a first port of a first module of the plurality of modules to emit a test signal, wherein the light source comprises an optical amplifier disposed in the first module, and wherein controlling the light source comprises driving the amplifier to emit Amplified Spontaneous Emission (ASE) light as the test signal;
determining whether or not the test signal is received at a first photo-detector connected to a second port; and
validating a continuity of an unused connection that is out-of-service in the OADM between the first port and the second port when the test signal is received at the first photo-detector, wherein the light source and the photo-detector are disposed in the OADM, and wherein the unused connection between the first port and the second port comprises one or more loop-backs in the at least one multi-fiber cable connecting modules via loop-back connectors connected on unused ports thereon, wherein the one or more loop-backs optically connect corresponding pairs of fibers in the at least one multi-fiber cable connecting modules such that an optical signal is routed back to a particular module from which the optical signal was received.

2. The method as claimed in claim 1, wherein the optical amplifier is an Erbium Doped Fiber Amplifier (EDFA).

3. The method as claimed in claim 1, further comprising filtering the ASE light to generate a narrow-band test signal having a predetermined wavelength.

4. The method as claimed in claim 1, wherein the light source comprises a dedicated optical emitter and wherein controlling the light source comprises controlling the dedicated optical emitter to emit the test signal.

5. The method as claimed in claim 1, wherein the first module is a Multi-Cast Switch (MCS) module configured to route wavelength channels to and from respective transceivers of the OADM, and wherein controlling the light source comprises controlling a transmitter of a transceiver coupled to the MCS module to emit the test signal.

6. The method as claimed in claim 1, further comprising steps of:
measuring an optical power of the test signal received by the photo-detector;
comparing the measured optical power to an optical power of the test signal emitted by the light source; and
determining losses of the connection between the first port and the second port based on the comparison result.

7. The method as claimed in claim 1, wherein controlling the light source comprises modulating information onto the test signal.

8. The method as claimed in claim 7, wherein the information comprises information identifying a source of the test signal within the OADM.

9. The method as claimed in claim 8, further comprising steps of:
detecting the information modulated on the test signal received by the photo-detector;
identifying the source of the test signal based on the detected information; and
mapping a topology of the OADM based on the identified source of the test signal and the first photodetector.

10. The method as claimed in claim 1, wherein the second port is an input port of a second module.

11. The method as claimed in claim 10, wherein the connection between the first port and the second comprises a light path between the first and second modules via a Fiber Interconnection Module (FIM).

12. A non-transient machine readable storage medium including software instructions for controlling a processor to execute a method of validating connections in an optical add/drop multiplexer (OADM) comprising a plurality of modules configured to route optical signals through the OADM, and at least one multi-fiber cable connecting modules of the OADM, the software instructions comprising instructions for controlling the processor to:
control a light source coupled to a first port of a first module to emit a signal, wherein the light source comprises an optical amplifier disposed in the first module, and wherein the software instructions for controlling the processor to control the light source comprises software instructions for controlling the processor to drive the amplifier to emit Amplified Spontaneous Emission (ASE) light as the test signal;
determine whether or not the signal is received at a first photo-detector connected to a second port; and
validate a continuity of an unused connection that is out-of-service between the first port and the second port when the signal is received at the first photo-detector, wherein the light source and the photo-detector are disposed in the OADM, and wherein the unused connection between the first port and the second port comprises one or more loop-backs in the at least one multi-fiber cable connecting modules via loop-back connectors connected on unused ports thereon, wherein the one or more loop-backs optically connect corresponding pairs of fibers in the at least one multi-fiber cable connecting modules such that an optical signal is routed back to a particular module from which the optical signal was received.

13. The storage medium as claimed in claim 12, wherein the light source comprises a dedicated optical emitter and wherein the software instructions for controlling the processor to control the light source comprises software instructions for controlling the processor to control the dedicated optical emitter to emit the test signal.

14. The storage medium as claimed in claim 12, wherein the first module is a Multi-Cast Switch (MCS) module configured to route wavelength channels to and from respective transceivers of the OADM, and wherein the software instructions for controlling the processor to control the light source comprises software instructions for controlling the processor to control a transmitter of a transceiver coupled to the MCS module to emit the test signal.

15. The storage medium as claimed in claim 12, further comprising software instructions for controlling the processor to:
measure an optical power of the test signal received by the photo-detector;
compare the measured optical power to an optical power of the test signal emitted by the light source; and
determine losses of the connection between the first port and the second port based on the comparison result.

16. The storage medium as claimed in claim 12, wherein the software instructions for controlling the processor to control the light source comprises software instructions for controlling the processor to modulate information onto the test signal.

17. The storage medium as claimed in claim 16, further comprising software instructions for controlling the processor to:
detect the information modulated on the test signal received by the photo-detector;
identify a source of the test signal based on the detected information; and
map a topology of the OADM based on the identified source of the test signal and the first photodetector.

* * * * *